United States Patent
Miyazawa et al.

(10) Patent No.: US 8,469,845 B2
(45) Date of Patent: Jun. 25, 2013

(54) CHAIN

(75) Inventors: Toshihiko Miyazawa, Osaka (JP); Toyonaga Saitoh, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 508 days.

(21) Appl. No.: 12/711,400

(22) Filed: Feb. 24, 2010

(65) Prior Publication Data

US 2010/0267504 A1  Oct. 21, 2010

(30) Foreign Application Priority Data

Apr. 16, 2009 (JP) ................. 2009-099675

(51) Int. Cl.
*F16G 13/02* (2006.01)
*F16G 13/04* (2006.01)

(52) U.S. Cl.
USPC ................ 474/206; 474/212; 474/213

(58) Field of Classification Search
USPC ............. 474/202, 203, 206, 209, 213, 212
See application file for complete search history.

(56) References Cited

U.S. PATENT DOCUMENTS

| | | | | |
|---|---|---|---|---|
| 599,970 A | * | 3/1898 | Menk | 474/49 |
| 4,509,323 A | * | 4/1985 | Ledvina et al. | 59/8 |
| 5,154,674 A | | 10/1992 | Avramidis | |
| 5,437,148 A | * | 8/1995 | Karp | 59/78 |
| 5,879,257 A | * | 3/1999 | Tanaka | 474/207 |
| 6,220,981 B1 | * | 4/2001 | Yoshida | 474/111 |
| 7,419,449 B2 | * | 9/2008 | Tohara et al. | 474/213 |
| 7,437,870 B2 | * | 10/2008 | Wu | 59/4 |
| 7,585,239 B2 | * | 9/2009 | Miyazawa | 474/157 |
| 2003/0104891 A1 | * | 6/2003 | Saitoh et al. | 474/212 |
| 2005/0049098 A1 | * | 3/2005 | Butterfield | 474/212 |
| 2006/0030442 A1 | * | 2/2006 | Hubertus Maria van Rooij et al. | 474/215 |
| 2006/0079363 A1 | * | 4/2006 | Miyazawa | 474/206 |
| 2007/0180808 A1 | * | 8/2007 | Wu | 59/84 |
| 2008/0020882 A1 | * | 1/2008 | Tohara et al. | 474/212 |
| 2009/0111626 A1 | * | 4/2009 | Tohara et al. | 474/91 |

FOREIGN PATENT DOCUMENTS

| | | |
|---|---|---|
| JP | 59-63250 | 4/1984 |
| JP | 4-228951 | 8/1992 |

* cited by examiner

*Primary Examiner* — William A Rivera
*Assistant Examiner* — Henry Liu
(74) *Attorney, Agent, or Firm* — Howson & Howson LLP (57) ABSTRACT

In a transmission chain having link plates with convex edges for sliding contact with a guide surface, the plates are asymmetric in shape so that the distance from a line connecting the centers of the connecting holes and the convex edge is greatest at a position other than at the midpoint between the connecting holes. A pivoting action of the link plates takes place as they slide over a guide surface, changing the abutment point.

7 Claims, 10 Drawing Sheets

CHAIN

CROSS-REFERENCE TO RELATED APPLICATION

This application claims priority on the basis of Japanese patent application 2009-099675, filed Apr. 16, 2009. The disclosure of Japanese application 2009-099675 is hereby incorporated by reference.

FIELD OF THE INVENTION

This invention relates to a low friction chain for use in a power transmission mechanism, a conveying machine, or the like. The invention relates more specifically to a low friction chain particularly suitable for use as a timing chain in an automobile engine.

BACKGROUND OF THE INVENTION

In many power transmission mechanisms using a chain drive, an endless chain is in meshing engagement with a driving sprocket and with one or more driven sprockets. For example, in the timing drive of an automobile engine, a chain is driven by a crankshaft sprocket and drives one or more a camshaft sprockets. The chain is typically in sliding contact with one or more guide members including a movable tensioner lever and a fixed guide.

The chain is formed by articulably connecting a plurality of link plates which overlap one another along the length of the chain. Each link plate has a pair of connecting holes, and the plates are connected by insertion of connecting pins into the pin holes. At least some of the link plates have edges that come into sliding contact with a guide member.

In one well-known transmission chain, described in United States Patent Publication 2008/0020882, published Jan. 24, 2008, the shapes of the link plate edges which come into sliding contact with a guide member are in the form of convex curves so that the sliding contact area is reduced. At the same time, dynamic pressure generated in lubricant between the link plate edges and the guide surface reduces sliding contact resistance.

Figure 10:
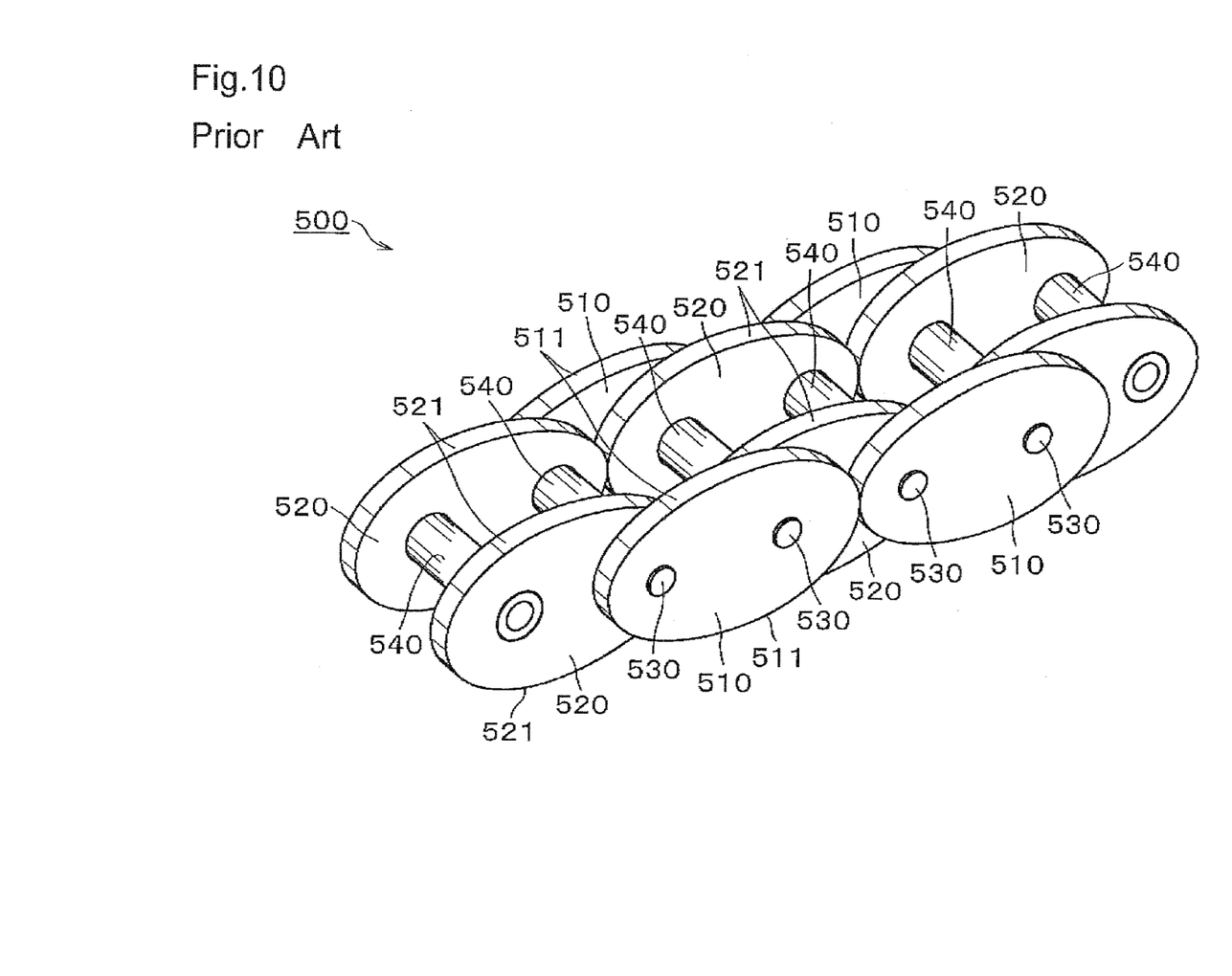
FIG. 10 is a perspective view of portion of a conventional chain.

The above-mentioned well-known transmission chain is shown as chain 500 in FIG. 10. Edges 511 of the inner link plates 520 of the chain, and edges 521 of outer link plates 510, are the edges that come into sliding contact with a guide member (not shown). These edges are in the form of convex curves, and only the parts of the edges that protrude farthest from the line connecting the centers of the connecting pins 530 come, into sliding contact with the guide member. The sliding contact area is reduced and, at the same time, a wedge-shaped oil film is generated in wedge-shaped spaces in front of the areas of sliding contact so that a Couette's current is set up, causing dynamic pressure in a lubricant to reduce sliding contact resistance.

In chain 500, the link plates 510 and 520 are symmetrical in the sense that widest parts of the link plates are located midway between the pin holes with reference to the direction of chain travel. All of the link plates 510 and 520 come into sliding contact with a guide member at the same location on each link plate. These contact locations are unaffected by changes in chain tension, and a large amount of abrasive wear of the link plates occurs. Consequently, intrusion of powder, dust and the like produced by wear occurs, and vibration, contact noise and the like are liable to occur.

An object of the invention is to solve the above-mentioned problems, by providing a chain in which the sliding contact area is reduced, dynamic pressure is generated in the lubricant so that sliding contact resistance is reduced, and, at the same time, the locations on the link plate edges that contact a guide member are varied so abrasive wear is reduced, intrusion of wear powder, dust and the like is reduced, and vibration and contact noise are also reduced.

SUMMARY OF THE INVENTION

The chain transmission according to the invention comprises a chain and a guide member. The chain comprises a plurality of link plates each having front and rear connecting holes. The link plates are pivotably connected to one another, and each of the link plates has an edge arranged for sliding contact with the guide member. The chain can include link plates having edges that do not contact the guide member, and in that case, the plates having guide-contacting edges are preferably arranged, along the direction of travel of the chain, in alternating relationship with plates that do not have guide-contacting edges. The guide-contacting edge of at least one of the link plates, is a continuously curved edge, and the distance measured perpendicularly from a point on a line connecting the centers of the front and rear connecting holes to the edge is a maximum when that point is spaced from a location midway between the centers of the front and rear connecting holes. Thus, the link plate has an asymmetric shape.

The sliding contact area is reduced, and a dynamic pressure is generated in a lubricant so that a sliding contact resistance is reduced. In addition, because of its asymmetric shape, the asymmetric link plate moves pivotably while in sliding contact with a guide surface as a result of a moment produced by chain tension and friction between the plate and the guide surface. Pivoting movement takes place in accordance with disturbances such as changes in chain tension, changes in sliding contact resistance and intrusion of wear powder, dust and the like. The pivoting of the link plate varies the abutment position on the guide-contacting edge of the link plate. Thus, constant sliding contact at the same position on the edge of the link plate is avoided, and abrasive wear is reduced. At the same time the disturbances are absorbed by pivoting movement of the link plate.

In one preferred embodiment, the chain includes a plurality of asymmetric link plates having the above-described shape. These asymmetric link plates are connected in alternating relationship by connecting link plates. All of the edges of the connecting link plates are spaced from the guide member as the asymmetric link plates travel in sliding contact with the guide member. A large pivoting movement of the asymmetric link plates can be achieved so that sliding contact at the same position on each of the asymmetric link plates is reduced and abrasive wear is reduced. At the same time, disturbances are more effectively absorbed by pivoting movement of the asymmetric link plates, and more effective reduction of vibration and contact noise can be realized.

In another preferred embodiment, in each asymmetric link plate, the point on a line connecting the centers of the front and rear connecting holes from which the perpendicular distance to the guide member-contacting edge of the asymmetric link plate is maximum is located rearward, with reference to the direction of travel of the chain, of a location midway between the centers of the front and rear connecting holes thereof. In this embodiment, the direction of a turning moment of the link plate generated as a result of friction between the link plate and the guide surface is the same as the direction of the turning moment generated by pressure applied to the link plate by the guide. Thus increased pivotal movement of the link plate takes place, concentration of sliding contact at the same position on each link plate is reduced, and abrasive wear is reduced accordingly. At the same time, disturbances are absorbed by pivotal movement more effectively, and vibration and contact noise are reduced.

In still another embodiment, asymmetric link plates are arranged along the length of the chain in two sets in alternating relationship. The link plates of a first set have their widest parts forward of the midpoint between their front and rear connecting holes with reference to a direction of chain travel, and the link plates of a second set having their widest parts rearward of the midpoint between their front and rear connecting holes with reference to the direction of chain travel. In this embodiment, whatever the direction of travel of the chain is, sliding contact resistance can be reduced, and disturbances can be absorbed so that vibration and contact noise are reduced.

In still another preferred embodiment, a portion of the continuously curved edge of the asymmetric link plate that contacts the guide is in the shape of an arc centered on a point on an extension of the line perpendicularly intersecting the point on a line connecting the centers of the front and rear connecting holes from which the distance to the edge of the link plate is a maximum. In this case, the shape of the wedge-shaped space in front of the sliding contact area is not changed as a result of pivoting movement of the link plate. Thus, sliding contact resistance is reduced stably, and the effect of disturbances is reduced, whereby vibration and contact noise can be reduced.

In an embodiment in which the link plates of the chain are plates of a chain from the group consisting of roller chains and rollerless bushing chains, and in which least one of the link plates has a second edge opposite from the continuously curved edge, the second edge is also a continuously curved edge, and the distance measured perpendicularly from a point on a line connecting the centers of the front and rear connecting holes to the second edge is also a maximum when the last-mentioned point is spaced from a location midway between the centers of the front and rear connecting holes, either edge can come into sliding contact with a guide surface. The sliding contact area is reduced, and dynamic pressure in the lubricant reduces sliding contact resistance. Here again, the position on the plate at which sliding contact occurs varies, and abrasion wear is reduced. Disturbances are also absorbed by pivotal movement of the link plate, whereby vibration and contact noise are reduced.

Many of the advantages of the invention can be realized in a silent chain in which link plates are toothed link plates, and in which the convex edge of is a back of a toothed link plate. That is, the sliding contact area is reduced, dynamic pressure is generated in the lubricant to reduce sliding contact resistance, and the location on the link plate back at which sliding contact takes place varies, reducing abrasion wear. In addition, pivotal movement of the plates reduces vibration and contact noise.

BRIEF DESCRIPTION OF THE DRAWINGS

FIG. 6b is an enlarged view showing in detail the sliding contact portion of the link plate, within the circle in FIG. 6a.

DETAILED DESCRIPTION OF THE PREFERRED EMBODIMENTS

The chain transmission according to the invention comprises a chain comprising a plurality of link plates each having front and rear connecting holes. The link plates are pivotably connected to one another, and each of the link plates has an edge arranged for sliding contact with the guide member. The guide-contacting edge of at least one of these link plates, is a continuously curved edge, and the distance measured perpendicularly from a point on a line connecting the centers of the front and rear connecting holes to said edge is a maximum when said point is spaced from a location midway between the centers of the front and rear connecting holes. Thus, said at least one said link plate has an asymmetric shape. As a result of the asymmetric link plate profile, the sliding contact area is reduced, and dynamic pressure is generated in lubricant between the surface of the guide member and the continuously curved edge of the link plate. In addition, because the link plate can pivot, the guide member is not always in contact with the same part of the link plate edge as the link plate moves over the guide surface. That is, the abutment position varies. The variation of the abutment position reduces abrasive wear, intrusion of wear powder, dust and the like, and reduces vibration and contact noise.

Various embodiments of the chain according to the invention may be adopted. For example, the invention can be embodied in a transmission utilizing a roller chain, a rollerless bushing chain, or a silent chain.

Figure 1:
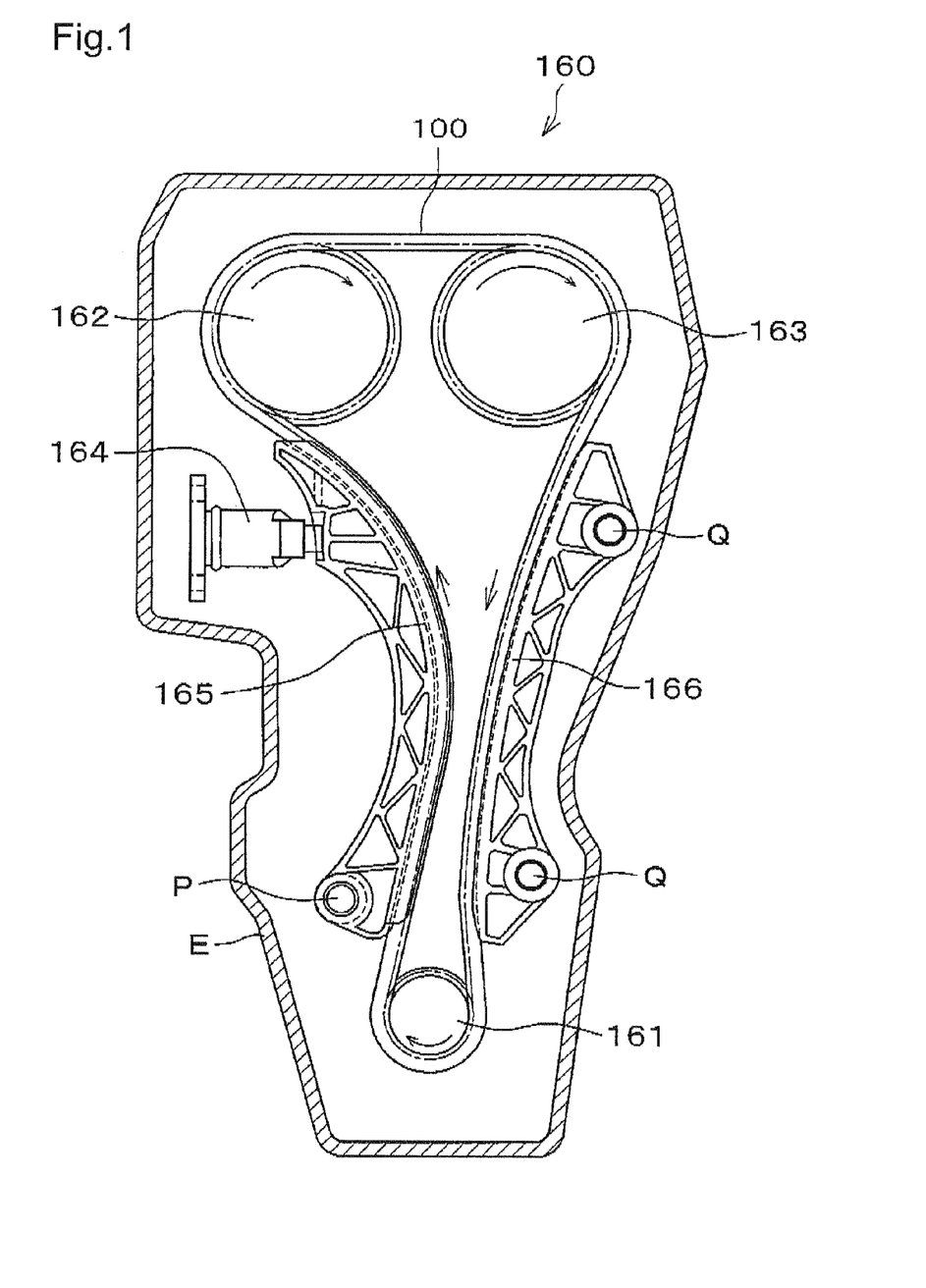
FIG. 1 is an elevational view of an engine timing drive incorporating a chain in accordance with the invention.

FIG. 1 shows a timing drive device 160 in a dual overhead cam (DOHC) internal combustion engine, which is an example of a device in which a chain according to the invention is used. A chain 100 is wrapped around a driving sprocket 161 provided on the engine crankshaft, and around driven sprockets 162 and 163 respectively provided on two valve-operating camshafts.

A slack-side chain guide 165 is provided in sliding contact with the span of chain 100 that travels from the driving sprocket 161 to the slack side driven sprocket 162. The chain guide 165 includes a shoe which is urged into contact with the chain by a tensioner 164 in order to maintain appropriate tension in the chain 100 and to prevent vibration of the chain. A fixed guide 166 is in sliding contact with the tension span of the chain that travels from tension side driven sprocket 163 toward the driving sprocket 161. This guide 166 restricts the traveling path of the tension span of the chain, and maintains a predetermined span length.

The slack side chain guide 165 is pivotally attached to a frame E of the engine on a pivot P such as a mounting bolt, a mounting pin or the like. The fixed tension side chain guide 166 is fixed to the frame E by mounting bolts or pins Q.

Figure 2:
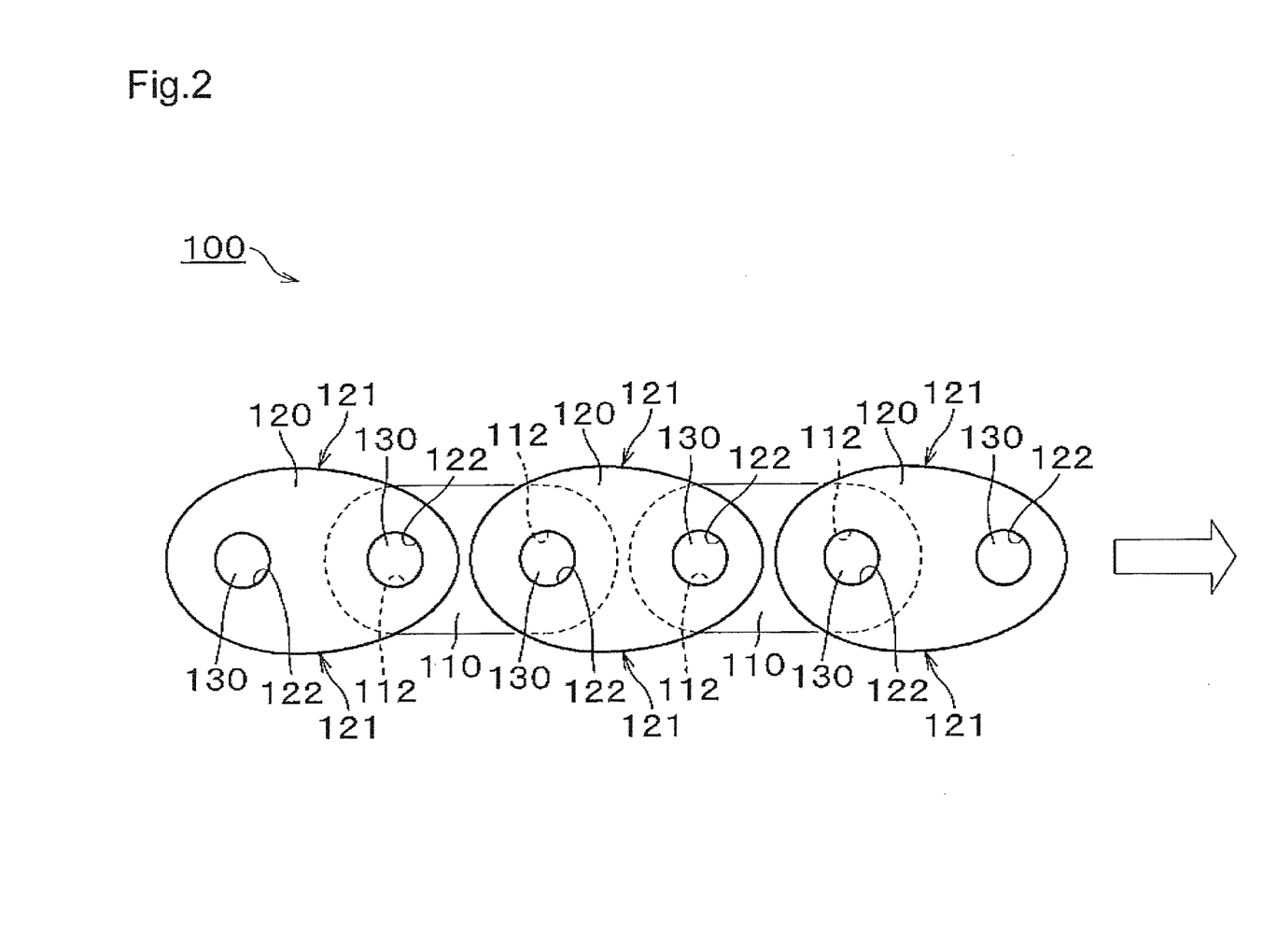
FIG. 2 is a side elevational view of a portion of a chain according to a first embodiment of the invention.

The chain 100, according to a first embodiment of the invention, is formed as shown in FIG. 2. On each side of the chain, a plurality of inner link plates 110 and a plurality of outer link plates 120 are arranged in alternating, overlapping relationship, and interconnected articulably to one another by connecting pins 130 in connecting holes 112 and 122.

In this embodiment, which is a rollerless bushing chain, bushings are fitted to connecting holes 112 of the inner link plates 110, and connecting pins 130 extend through and fit loosely in the bushings as in the above-described chain 500 of FIG. 10. In the case of a roller chain, the chain structure is similar to that of FIG. 2, except that rollers are loosely rotatable on the outer circumferences of the bushings.

The upper and lower edges of the outer link plate 120 are convexly shaped edges 121, formed in a continuously curved shape. The distance between the upper and lower edges of the inner link plates 110 is to be smaller than the distance between the convex upper and lower edges of the outer link plates 120 so that the upper and lower edges of the inner link plate 110 do not come into sliding contact with the guide members.

Figure 3:
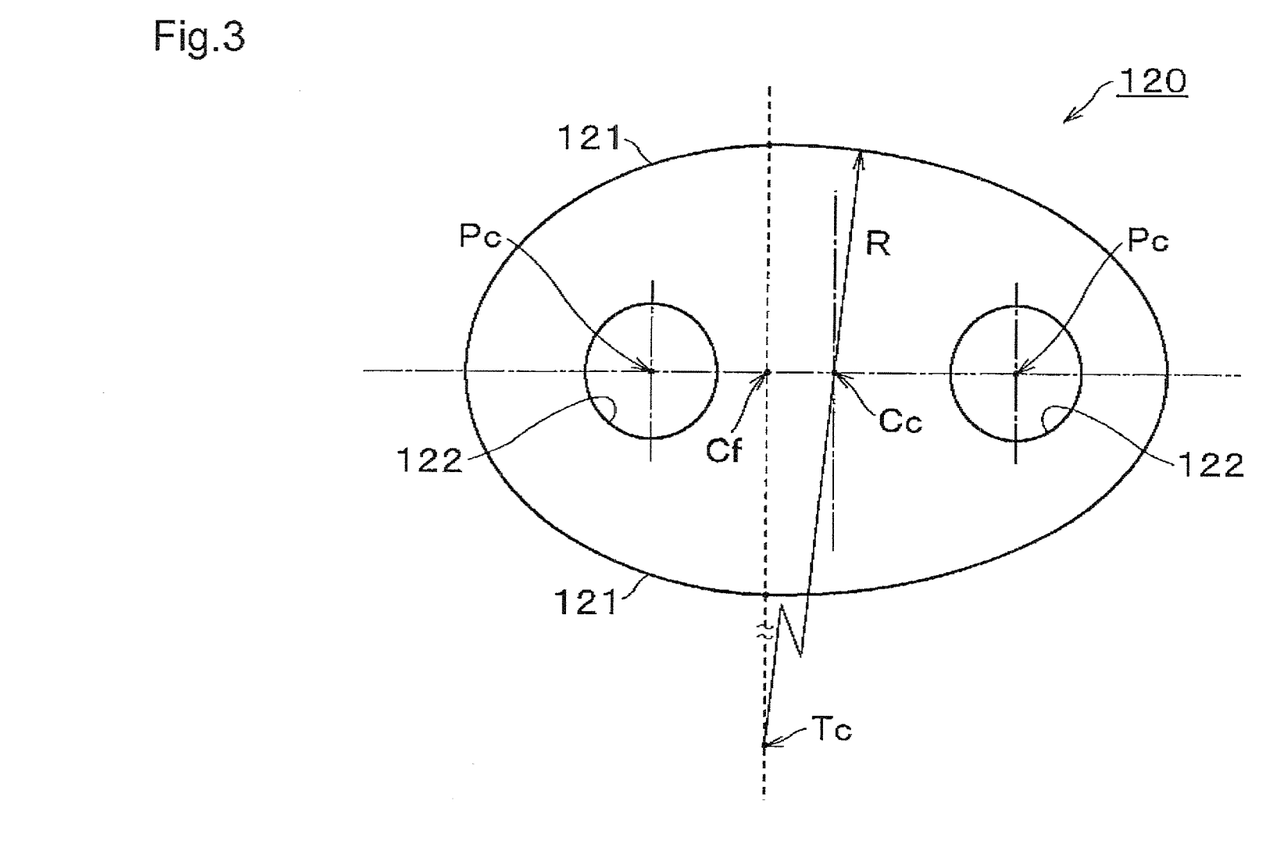
FIG. 3 is a side elevational view of a link plate of the chain of FIG. 2.

As shown in FIG. 3, the outer link plates 120 are asymmetric. The distances measured perpendicularly from a point Cf on a line connecting the centers Pc of the front and rear connecting holes to the edge 121 is a maximum when the point Cf is spaced from a location Cc midway between the centers of the front and rear connecting holes.

The convexly-shaped edge 121 of the outer link plate 120 is formed so that the part that comes into sliding contact with a guide member is in the form of an arc having a radius R centered on a point Tc on an extension of a line perpendicular to the centerline between pin hole centers Pc and intersecting that line at point Cf. Thus the outer link plate 120 has an oval shape. The oval shape shown is exaggerated in FIG. 3. In practice radius R can be very large, and the convexly-shaped edge 121 can be very close to a straight line. The arc shape extends from a first location on one side of the line through points Tc and Cf to a second location on the other side of that line, through a distance such that all parts of the edge 121 that come into contact with a guide surface as the link plate 120 pivots are within the limits of the arc, that is, between said first and second locations. In the link plate of FIG. 3, the first location is to the right of the vertical line through mid-point Cc. Preferably, the arc shape continues from a line perpendicular to the line connecting the centers Pc of the connecting holes and intersecting one of the centers Pc, to a corresponding line intersecting the other connecting hole center. In other words, in FIG. 3, the arc extends from a point directly above one of the connecting hole centers Pc to a point directly above the other connecting hole center. Ordinarily, these points do not come into contact with the guide surface.

Figure 4:
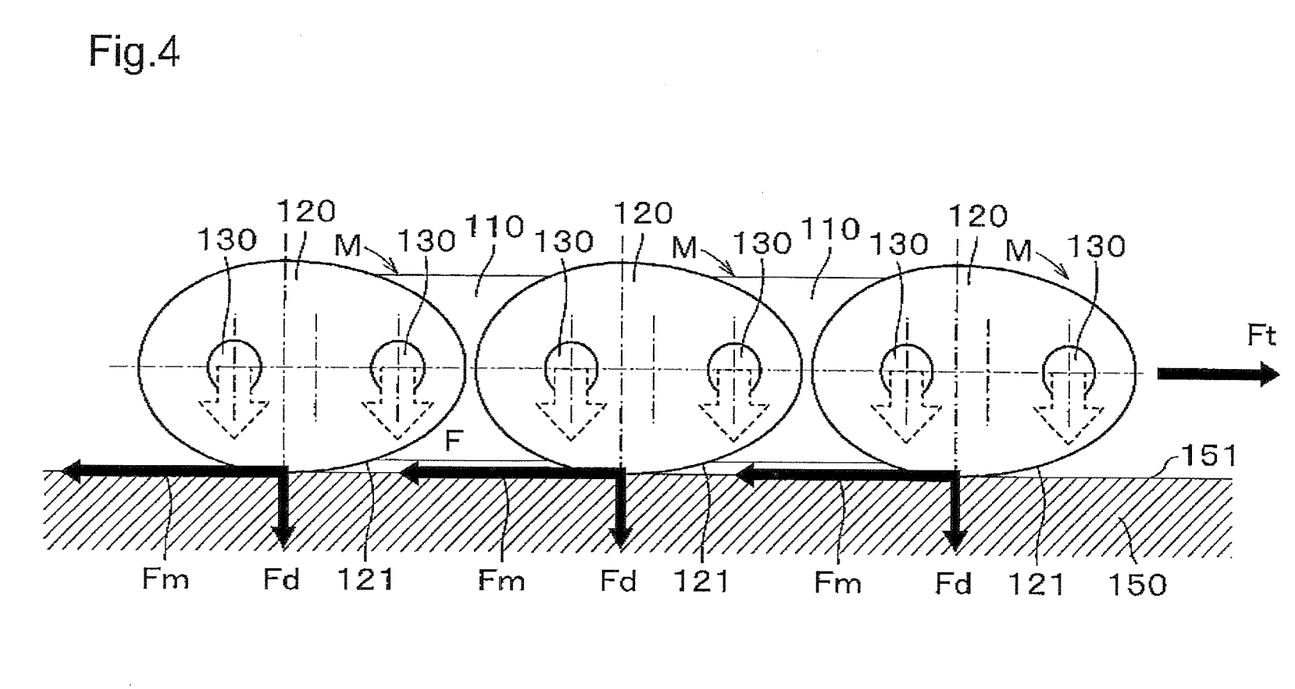
FIG. 4 is a schematic view depicting the operation of the chain of FIGS. 1, 2 and 3.
Figure 5:
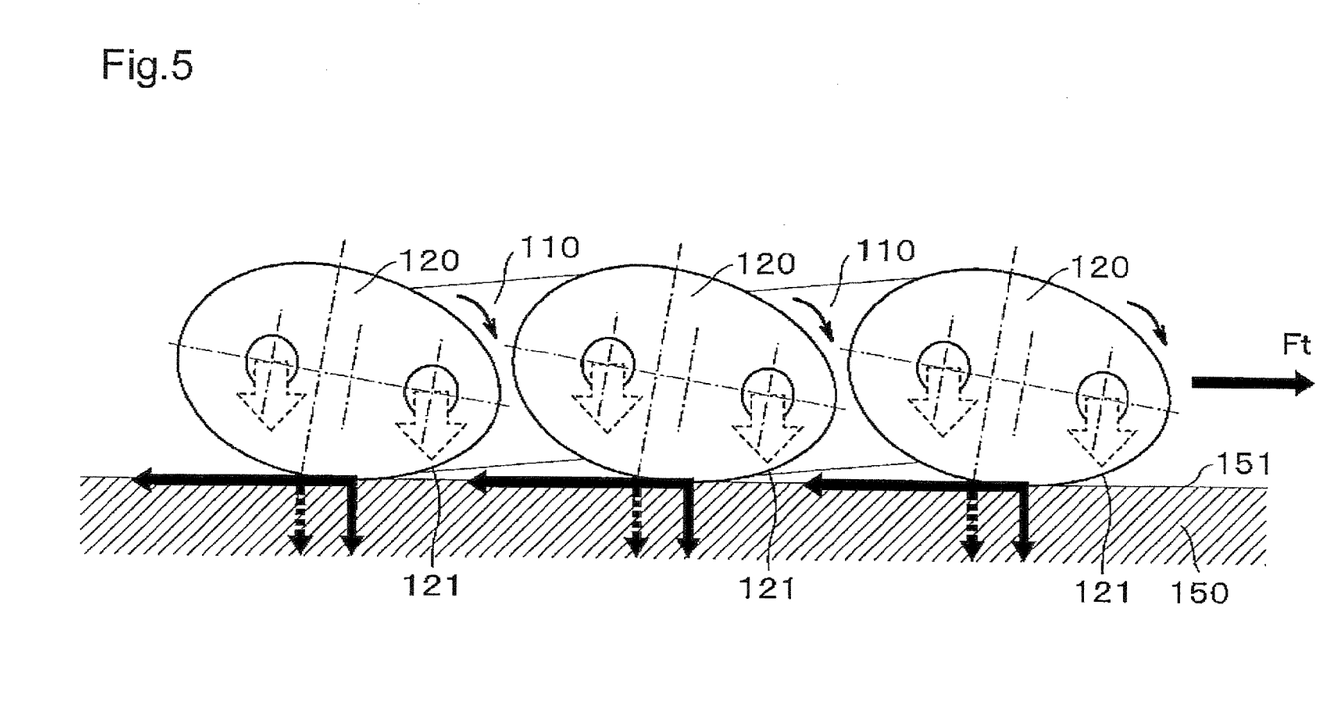
FIG. 5 a schematic view depicting the operation of the chain of FIGS. 1, 2 and 3 when link plates of the chain are pivoted.
Figure 6A:
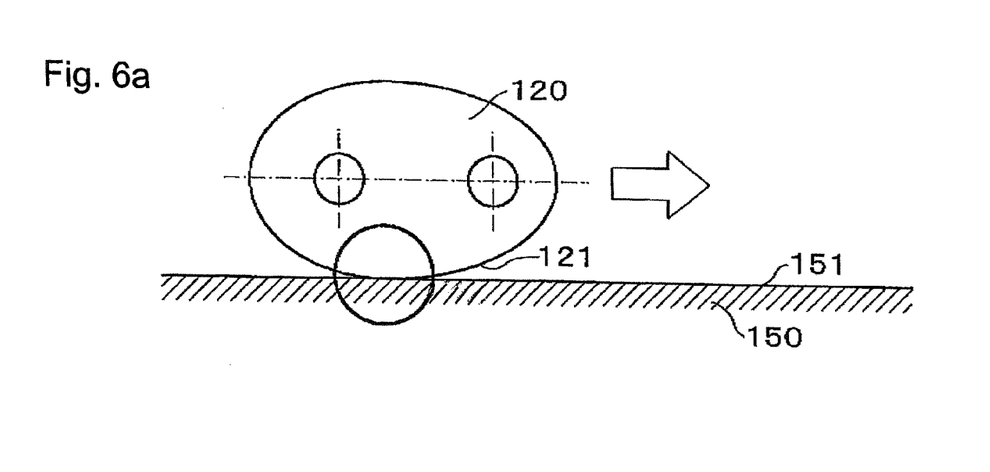
FIG. 6a is schematic view of the link plate of FIG. 3.
Figure 6B:
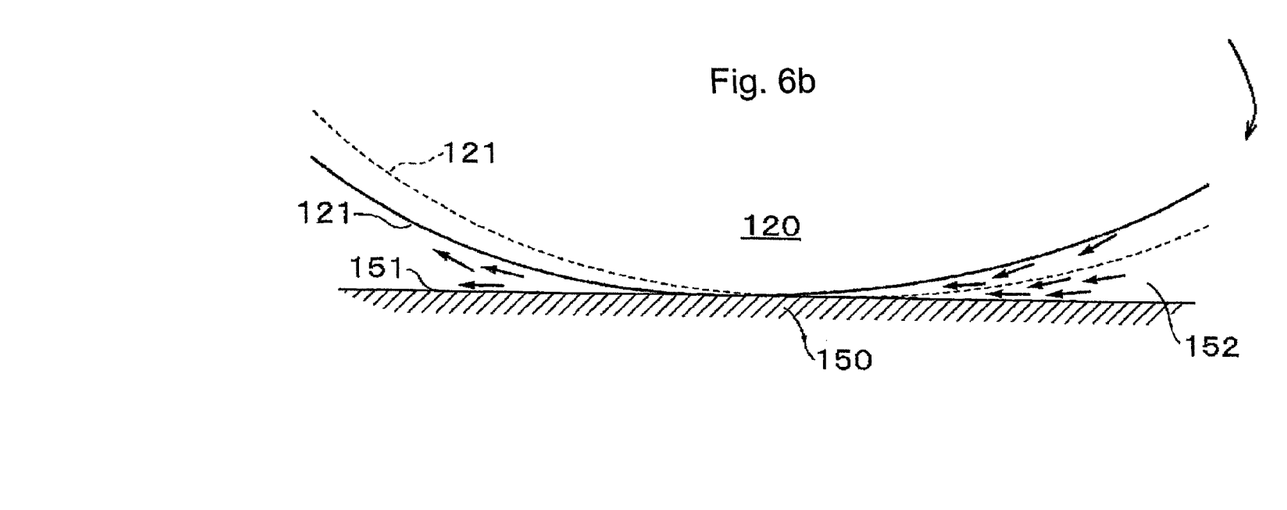

FIGS. 4 to 6 depict the operation of the chain 100. When the convexly-shaped edges 121 of outer link plates 120 of chain 100 come into sliding contact with a guide surface 151 of a guide member 150, and the chain travels toward the right in the drawings, a pressing force Fd and a frictional force Fm are generated at the contact points as shown in FIG. 4.

A turning moment M, which rotates the outer link plates 120 clockwise, is generated by the frictional force Fm. As a result of the turning moment M, the front and rear connecting pins 130 in each outer link plate become spaced from the guide surface 151 by different distances. Thus, as shown in FIG. 5, the outer link plates 120 are pivoted slightly clockwise on the guide surface 151. The tension Ft of the chain 100 limits the clockwise rotation of the outer link plates, preventing the distances between the respective connecting pins 130 measured along the direction of chain travel from being shortened. Thus, the tension Ft produces a turning moment which tends to turn the outer link plates 120 counterclockwise. Therefore as the chain 100 travels along the guide surface 151, the frictional force Fm and the tension Ft balanced each other.

The fact that the outer link plates are connected to one another by inner link plates that do not come into contact with the guide members enables the outer link plates to pivot downward and forward from the condition shown in FIG. 4, as depicted in FIG. 5. Therefore, even if disturbances such as changes in chain tension, changes in sliding contact resistance, and intrusion of powder resulting from wear, dust and the like are generated, the disturbances are absorbed by pivoting of the outer link plates 120, and the generation of vibration and contact noise is reduced. Furthermore, as a result of their pivoting action, the contact points on the link plates at which sliding contact with the guide members takes place varies, and abrasive wear is therefore reduced.

As shown in FIG. 6, an edge film effect is generated in a wedge-shaped space 152, forward of the point of contact between the convex edge 121 of the outer link plate 120 and the surface 151 of the guide member 150. As the chain travels along the guide surface 151, a Couette's current is generated and dynamic pressure in the lubricant reduces sliding contact resistance. Since the convexly-shaped edge 121 of the outer link plate 120 is in the form of an arc, the dynamic pressure effect takes place consistently and without change even as the outer link plate 120 is pivoted from the position shown by a solid line to the position shown by the dotted line in FIG. 6.

Figure 7A:
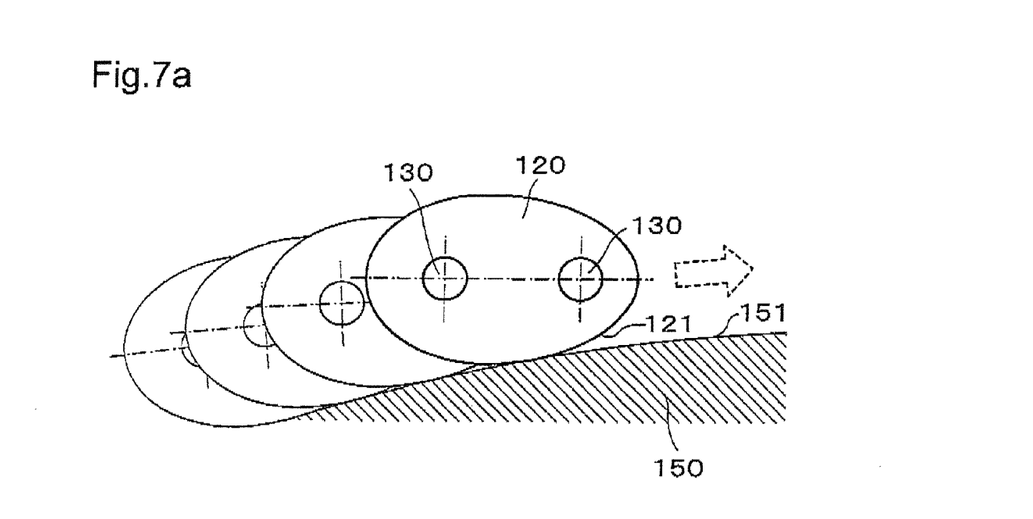
FIGS. 7a and 7b are respectively schematic views showing the chain of the invention and a conventional chain in sliding contact with a curved surface.
Figure 7B:
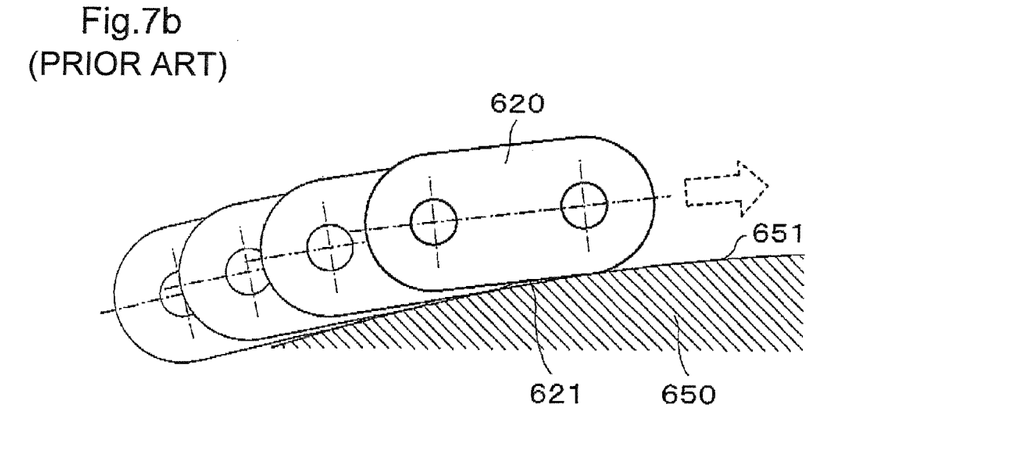

In the case of a chain having conventional symmetrical link plates as shown in FIG. 7b, where a curved sliding contact surface 651 comes into contact with a flat edge 621 of a link plate 620, a rapid change in the sliding contact relationship between the link plate and the guide member can occur, generating vibration and noises. However, as shown in FIG. 7a, since the part of the convex edge 121 of the outer link plate 120 that contacts the guide surface is in the form of an arc, even though the surface 151 of the guide member 150 is curved as in FIG. 7a, the sliding contact relationship does not change. Smooth travel of the chain over the guide can take place, and vibration and noises can be prevented.

Figure 8:
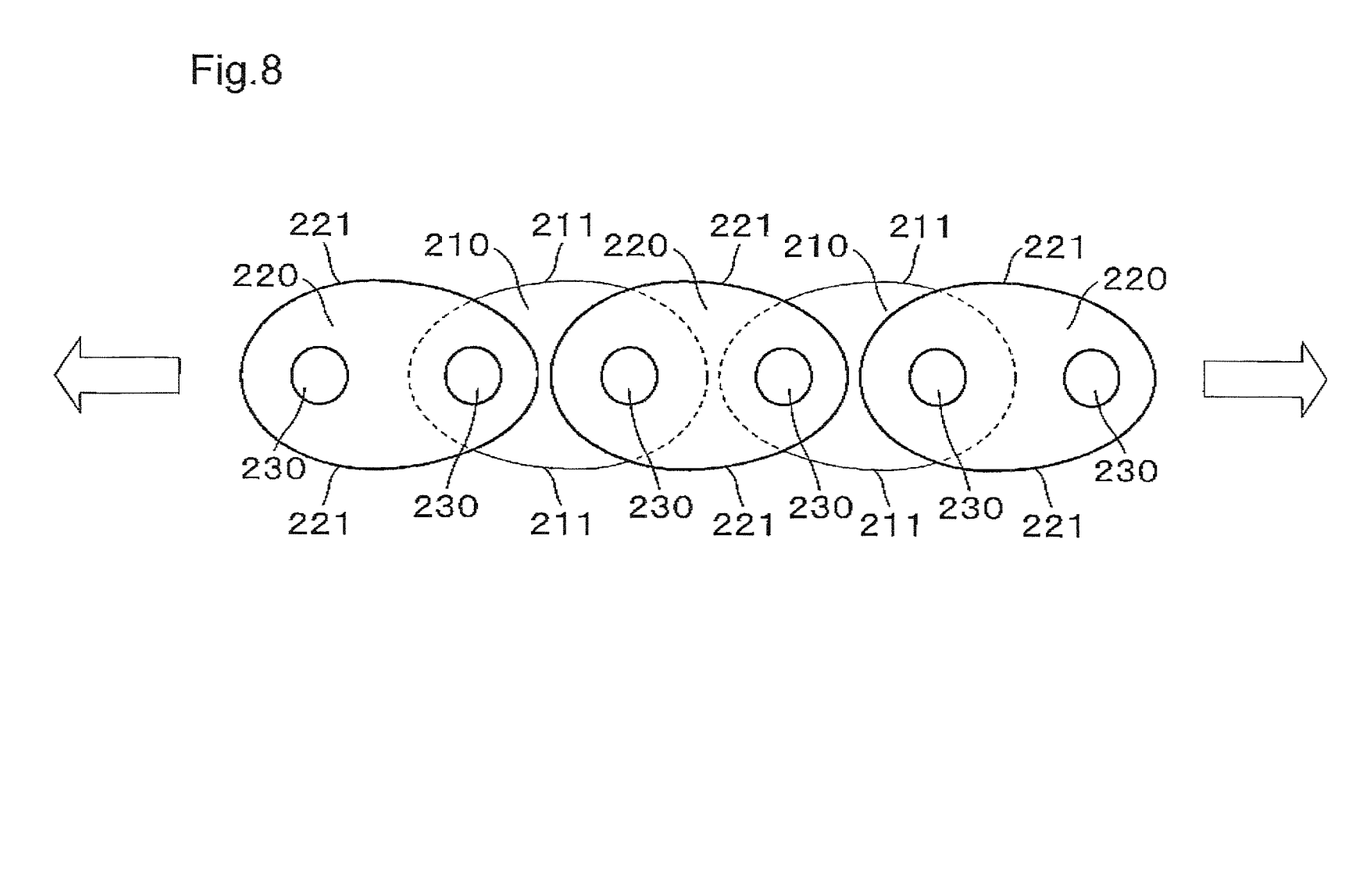
FIG. 8 is a side elevational view showing a portion of a chain according to a second embodiment of the invention.

In a second embodiment of the invention shown in FIG. 8, a chain 200 is composed of alternating inner and outer links comprising respectively inner link plates 210 and outer link plates 220. The links are arranged in alternating, overlapping relationship along the length of the chain and interconnected articulably by connecting pins 230. Inner links are formed of two inner plates connected in laterally spaced relationship by a pair of bushings fitted to bushing holes in the link plates. The outer links are formed by a pair of laterally spaced outer link plates connected by pins fitted to pin holes in the outer plates and extending rotatably through bushings of the inner links whereby the inner and outer links are connected in articulating relationship. In the case of a roller chain, rollers can be loosely fitted on outer circumferences of the bushings.

The upper and lower edges 221 of the outer link plates 220 and the upper and lower edges 211 of the inner link plates 210 are convex and formed in a continuously curved shape so that the plates can be guided while in sliding contact with a guide member. The plates are asymmetric in the front and rear direction as in the case of the outer link plate 120 of FIG. 3. Thus the distance between a line connecting the centers of the connecting holes and a convexly-shaped edge is maximum at a position spaced from the point midway between the centers of the connecting holes.

The asymmetric shapes of the outer link plates 220 and the inner link plates 210 are disposed in opposite directions along the length of the chain. Thus, with reference to the direction of travel of the chain, the widest parts of plates 220 are rearward of the midpoints of the plates, whereas the widest parts of plates 210 are forward of their mid points. Therefore, the turning moments generated by frictional forces, are in opposite directions for the inner and outer links. Regardless of the direction of travel of the chain, the turning moments of the inner and outer links oppose each other. If disturbances such as a change in tension in the chain 200, a change in sliding contact resistance, or intrusion of powder, dust and the like occur, the outer link plates 220 or the inner link plates 210 are pivotably moved and balance each other while absorbing the disturbances. Thus the generation of vibration and noise can be reduced. Furthermore, since the abutment positions between the link plates and the sliding contact guide surface are varied, sliding contact at the same position is reduced and abrasive wear is reduced.

Figure 9:
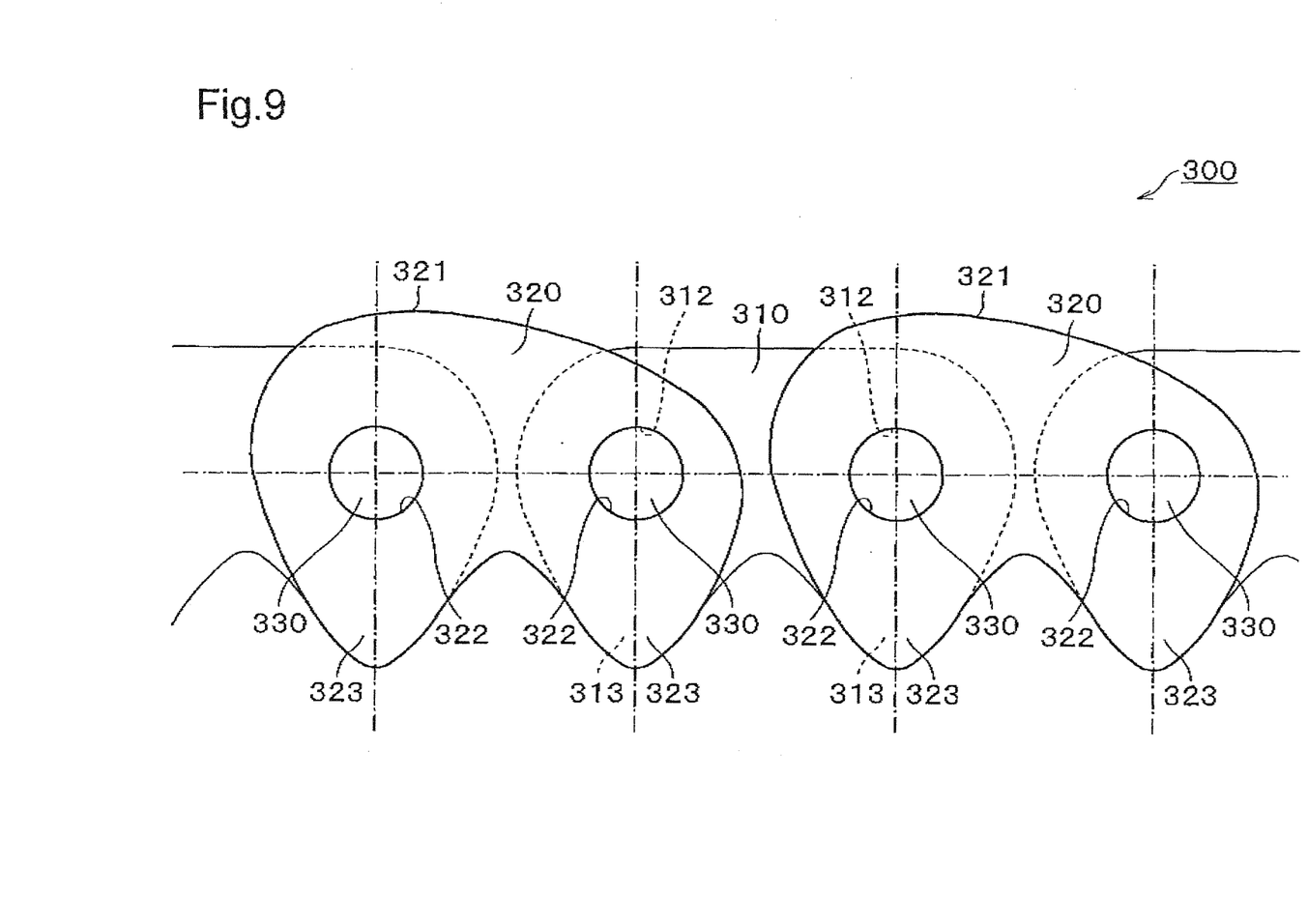
FIG. 9 is a side elevational view showing a portion of a chain according to a third embodiment of the invention.

In a third embodiment of the invention shown in FIG. 9, a chain 300 is composed of toothed inner link plates 310 and toothed outer link plates 320 arranged in widthwise rows interleaved with one another and connected articulably by connecting pins as in a conventional silent chain.

The lower edges of the link plates 310 and 320 are respectively formed with teeth 313 and 323 for meshing engagement with sprockets (not shown).

The upper edges 321 of the outer link plates are in the form of continuous convex curves for sliding contact with a guide member. As in the outer link plate 120 of the first embodiment, shown in FIG. 3, the distance between a line connecting the centers of the front and rear connecting holes 322 of these outer link plates and the convexly-shaped edge 321 is a maximum at a position spaced from the midpoint between the connecting holes. The parts of the link plate backs that contact the guide surface are also preferably in the form of an arc as in the previously described embodiment shown in FIG. 3. The upper edges of the inner link plates 310, however, are lower than the convex edges 321 so that they do not come into sliding contact with a guide.

The chain of FIG. 9 performs in a manner similar to that of the chain shown in FIGS. 2-5 in its cooperation with a guide member. When the convex back surfaces of the chain are in sliding contact with a guide, even if disturbances such as changes in tension, changes in sliding contact resistance, or intrusion of wear powder, dust and the like occur, the link plates 320 pivot and balance one another, absorbing these disturbances can be absorbed. Thus, vibration and noise can be reduced. And at the same time, since the abutment positions vary as a result of the pivoting action of the link plates, sliding contact at the same positions is reduced and that abrasive wear is reduced.

The shape of the link plates 310 can be made the same as that of the link plate 320, and the link plates can be alternately, oppositely disposed along the direction of travel of the chain as in the second embodiment. In this case, advantages similar to those afforded by the version depicted in FIG. 9 can be realized. In the silent chain embodiments as in the bushing chain and roller chain embodiments, a wedge-shaped space is created at the contact point between the convexly-shaped back edge of the link plates and the guide surface on the front side. An edge film effect is generated as the chain travels in sliding contact with the guide and a Couette's current is generated. Thus, a dynamic pressure in the lubricant reduces sliding contact resistance. When the link plate comes into sliding contact with a curved guide surface, the condition of sliding contact does not change abruptly. Pivoting and sliding contact travel take place smoothly, and vibration and noise can be prevented.

What is claimed is:

1. A chain transmission comprising:
   a chain comprising a plurality of link plates each having front and rear connecting holes, the link plates being pivotably connected to one another; and
   a guide member;
   each of the link plates having an edge arranged for sliding contact with the guide member;
   in which said edge of at least one of said link plates has a continuous convex curvature extending at least from a point on said edge intersected by a line perpendicular to a connecting line through the centers of said front and rear connecting holes and extending through one of said centers to a point on said edge intersected by a line perpendicular to said connecting line and extending through the other of said centers, and the distance measured perpendicularly from a point on a line connecting the centers of the front and rear connecting holes to said edge is a maximum when said point is spaced from a location midway between the centers of the front and rear connecting holes, whereby said at least one said link plate has an asymmetric shape about a plane midway between said connecting holes and to which said connecting line is perpendicular.

2. A chain transmission according to claim 1, including a plurality of asymmetric link plates having the shape of said one of said link plates, said asymmetric link plates being connected in alternating relationship by connecting link plates having edges, wherein all of the edges of said connecting link plates are spaced from said guide member as the asymmetric link plates travel in sliding contact with the guide member.

3. A chain transmission according to claim 2, in which the chain is driven so that it travels in a direction relative to said guide member, and in which, in each said asymmetric link plate, the point on a line connecting the centers of the front and rear connecting holes from which the distance to the guide member-contacting edge of the asymmetric link plate is a maximum is located rearward, with reference to the direction of travel of the chain, of a location midway between the centers of the front and rear connecting holes thereof.

4. A chain transmission according to claim 1, including a plurality of asymmetric link plates having the shape of said one of said link plates, wherein said asymmetric link plates are arranged along the length of the chain in two alternating sets, the link plates of a first set having their widest parts forward of the midpoint between their front and rear connecting holes with reference to a direction of chain travel, and the link plates of a second set having their widest parts rearward of the midpoint between their front and rear connecting holes with reference to said direction of chain travel.

5. A chain transmission according to claim 1, in which a portion of the continuously curved edge of the asymmetric link plate that contacts the guide is in the shape of an arc centered on a point on an extension of a line perpendicularly intersecting the point on a line connecting the centers of the front and rear connecting holes from which the distance to the edge of the link plate is a maximum.

6. A chain transmission according to claim 1, in which said link plates are link plates of a chain from the group consisting of roller chains and rollerless bushing chains, and in which said at least one of said link plates has a second edge opposite from said continuously curved edge, and wherein said second edge is also a continuously curved edge, and the distance measured perpendicularly from a point on a line connecting the centers of the front and rear connecting holes to said second edge is also a maximum when the last-mentioned point is spaced from a location midway between the centers of the front and rear connecting holes.

7. A chain transmission according to claim 1, in which said edge of said one of said link plates is a back of a toothed link plate forming a part of a silent chain.

* * * * *

UNITED STATES PATENT AND TRADEMARK OFFICE
CERTIFICATE OF CORRECTION

| | | |
|---|---|---|
| PATENT NO. | : 8,469,845 B2 | Page 1 of 1 |
| APPLICATION NO. | : 12/711400 | |
| DATED | : June 25, 2013 | |
| INVENTOR(S) | : Miyazawa et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 547 days.

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,469,845 B2  
APPLICATION NO. : 12/711400  
DATED : June 25, 2013  
INVENTOR(S) : Miyazawa et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 574 days.

This certificate supersedes the Certificate of Correction issued November 11, 2014.

Signed and Sealed this
Fifteenth Day of December, 2015

Michelle K. Lee
*Deputy Director of the United States Patent and Trademark Office*